United States Patent [19]

Suzuki et al.

[11] Patent Number: 5,053,473

[45] Date of Patent: Oct. 1, 1991

[54] METHOD FOR THE PRODUCTION OF LIQUID-CRYSTALLINE ORGANOPOLYSILOXANES

[75] Inventors: Toshio Suzuki; Tadashi Okawa, both of Chiba, Japan

[73] Assignee: Dow Corning Toray Silicone Company, Ltd., Tokyo, Japan

[21] Appl. No.: 187,123

[22] Filed: Apr. 28, 1988

[30] Foreign Application Priority Data

May 15, 1987 [JP] Japan .............................. 62-118365

[51] Int. Cl.$^5$ .............................................. C08G 77/06
[52] U.S. Cl. ........................................ 528/29; 528/15; 528/25; 528/31; 528/42
[58] Field of Search ................... 528/25, 29, 42, 15, 528/31

[56] References Cited

U.S. PATENT DOCUMENTS

| | | | |
|---|---|---|---|
| 3,172,899 | 3/1965 | Bailey | 528/29 |
| 3,297,735 | 1/1967 | Simmler | 528/29 |
| 4,358,391 | 11/1982 | Finkelmann et al. | 528/29 |
| 4,388,453 | 6/1983 | Finkelmann et al. | 528/15 |
| 4,410,570 | 10/1983 | Kreuzer et al. | 525/479 |
| 4,713,196 | 12/1987 | Praefcke et al. | 528/25 |

FOREIGN PATENT DOCUMENTS

| | | | |
|---|---|---|---|
| 0163495 | 12/1985 | European Pat. Off. | 528/31 |
| 0238789 | 9/1987 | European Pat. Off. | 528/28 |
| 2740019 | 3/1979 | Fed. Rep. of Germany . | |

*Primary Examiner*—John C. Bleutge
*Assistant Examiner*—Ralph H. Dean, Jr.
*Attorney, Agent, or Firm*—Sharon K. Severance; Robert L. McKellar

[57] ABSTRACT

The present invention relates to a method for the production of liquid-crystalline organopolysiloxane which provides for the facile introduction of a mesogenic group without the use of a hydrosilylation reaction.

5 Claims, No Drawings

METHOD FOR THE PRODUCTION OF LIQUID-CRYSTALLINE ORGANOPOLYSILOXANES

The present invention relates to a method for the production of liquid-crystalline organopolysiloxanes which provide for the facile introduction of a mesogenic group into the molecule without the use of a hydrosilylation reaction.

BACKGROUND OF THE INVENTION

A number of organic compounds exhibiting liquid crystallinity within particular temperature ranges have been disclosed in the art. Furthermore, a number of macromolecules exhibiting liquid crystallinity have been disclosed. These macromolecules contain groups in the main chain or as a dependent group, which exhibit liquid crystallinity. Liquid-crystalline organopolysiloxanes have been disclosed, for example, in Japanese OPI Numbers 56-79173, 57-165480, and 60-252486. Japanese OPI Number 56-79173 describes linear organopolysiloxane having pendant mesogenic groups, similarly, cyclic organopolysiloxanes are described in Japanese OPI Number 57-165480, and branched organopolysiloxanes are described in Japanese OPI Number 60-252486.

However, the methods for the preparation of the liquid-crystalline organopolysiloxanes disclosed in these patent applications consist solely of addition reactions between SiH-containing organopolysiloxanes and alkenyl groups bonded on mesogenic moieties. Noble metal catalysts, e.g., platinum, are used in these addition reactions between alkenyl groups and the silicon-bonded hydrogen atoms in the organopolysiloxanes, i.e. the hydrosilylation reaction, however, these catalysts are easily poisoned. Thus, the reaction is disturbed by the presence of impurities, for example, alkenes, alkynes, amines, phosphorus compounds, sulfur compounds, and organotin compounds, which may be present in the solvents and starting materials, or which may adhere to the walls of the reactor. Furthermore, the synthesis of alkenyl-containing mesogenic compounds is difficult and the yields are also low, making their acquisition both highly problematic and/or very expensive. As a consequence, it is unavoidable that liquid-crystalline organopolysiloxanes synthesized using such compounds will be very expensive.

In order to overcome the above-described problems encountered with the hydrosilylation reaction, the present invention provides a method for the production of liquid-crystalline organopolysiloxanes by which the mesogenic group can be easily introduced into the molecule, while employing readily available materials, and which does not require the use of the hydrosilylation reaction for the introduction of such mesogenic group.

THE INVENTION

The object of the present invention can be achieved by means of a method for the production of liquid-crystalline organopolysiloxanes which comprises contacting a compound having the general formula ROA with an organopolysiloxane containing in each molecule, at least one group of the unit formula

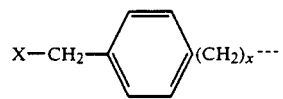

wherein R is a monovalent organic group which contains at least one group selected from the groups consisting of
(i) substituted monocyclic aromatic hydrocarbon groups,
(ii) substituted polycyclic aromatic hydrocarbon groups,
(iii) unsubstituted monocyclic aromatic hydrocarbon groups;
(iv) unsubstituted polycyclic aromatic hydrocarbon groups; A is a hydrogen atom or an alkali metal; X is a halogen; x has a value of 0 to 10 and, recovering the liquid-crystalline organopolysiloxane.

The organopolysiloxanes have at least one halomethylphenyl group in each molecule. The organopolysiloxane has a main backbone consisting primarily of polysiloxanes with alternating silicon and oxygen atoms. Its structure may be linear, cyclic, branched, or network. Linear and branched structures are preferred for this invention, and linear structures are most preferred. The halogen atom in the halomethylphenyl group is preferably selected from chlorine, bromine, and iodine. Among these, chlorine is especially preferred from the standpoint of ease of availability. The halomethylphenyl group can be directly bonded to the silicon atom in the organopolysiloxane, or can be bonded indirectly to silicon via an alkylene group. From the standpoint of generating good liquid crystallinity in the organopolysiloxane, it is preferred that the halomethylphenyl group be bonded indirectly through an alkylene group having on the order of one to ten carbon atoms, for example, methylene, ethylene, and propylene. With regard to the silicon-bonded organic groups other than halomethylphenyl groups and halomethylphenyl radical-containing groups, it is desirable that at least 50 mol % of the total organic groups be lower alkyl, and it is preferred that methyl groups make up at least 50 mol % of the total organic groups. The non-methyl organic groups are exemplified by alkyl groups such as ethyl, propyl, butyl, pentyl, and hexyl; alkenyl groups such as vinyl, allyl, propenyl, butenyl, pentenyl, and hexenyl; aryl groups such as phenyl, tolyl, and xylyl; and aralkyl groups such as benzyl and phenethyl. In addition, the silicon-bonded groups may include small quantities of the hydrogen atom, hydroxyl group, and alkoxy groups.

While the method for the preparation of such halomethylphenyl-containing organopolysiloxanes is not specifically restricted, they can be conveniently prepared by the following methods (1) and (2).

(1) Hydrosilylation of an alkenylbenzyl halide, for example vinylbenzyl chloride, with an organopolysiloxane containing silicon-bonded hydrogen such as methylhydrogenpolysiloxane, using noble metal catalysis, e.g., platinum.

Considering this type of synthesis of the halomethylphenyl-containing organopolysiloxane, using a hydrosilylation reaction as known from the art, synthesis of the alkenylbenzyl halide starting material is easier and the yields are higher than for the structurally complex alkenyl-substituted mesogenic compounds. The former can thus be acquired relatively inexpensively. Considering production of the liquid-crystalline organopolysiloxane in its entirety, the method of production of the present invention is easier, its yields are higher, and production is less expensive than the prior production method using hydrosilylation of an alkenyl-substituted mesogenic compound. For example, since alkenylbenzyl halides are distillable, the additional advantage accrues that catalyst poisons can be eliminated.

(2) The second method is the halogenation of the methyl group in the tolyl radical of methyltolydichlorosilane using gaseous halogen, e.g., chlorine, under UV irradiation, to obtain methyl(halomethylphenyl)dichlorosilane, which is then successively hydrolyzed and condensation polymerized.

The compound with the formula R—O—A functions to endow the above-described organopolysiloxane with liquid crystallinity. The oxygen-bonded hydrogen atom or alkali metal atom, that is, the group A, reacts with the halogen atom of the halomethylphenyl group bonded to the organopolysiloxane, and a --C—O—C-- bond is formed by the elimination of hydrogen halide or alkali metal halide. This reaction serves to introduce a mesogenic group and thus endow the organopolysiloxanes with liquid crystallinity. Hence, R must be a monovalent organic group containing at least one substituted or unsubstituted monocyclic or polycyclic aromatic hydrocarbon group or substituted or unsubstituted alicyclic hydrocarbon group. Examples of such groups R are substituted and unsubstituted phenyl, biphenyl, phenylalkyl, biphenylalkyl, benzoyl, phenylbenzoyl, cyclohexyl, and cyclohexylphenyl, as well as cholestrol derivatives. Substituted and unsubstituted biphenyl is preferred for the facile generation of liquid crystallinity in the organopolysiloxanes. Also preferred are biphenyls substituted by a polar group, for example, alkoxy, cyano, at the para position.

While this reaction is generally run in organic solvent, it can be executed in the absence of solvent. The preferred organic solvent used is that which should dissolve both of the reactants and the final product. Solvents generally used as solvents of these compounds are recommended. The following solvents, for example, are recommended: aromatics such as benzene, toluene, and xylene; aliphatics such as hexane and heptane; ethers such as tetrahydrofuran and diethyl ether; alcohols such as methanol, ethanol, propanol, and butanol; ketones such as acetone and methyl ethyl ketone; esters such as ethyl acetate and butyl acetate; chlorinated hydrocarbons such as carbon tetrachloride, trichloroethane, and chloroform; and dimethylformamide and dimethyl sulfoxide. Combinations of two or more solvents may also be used without adverse effects. The use of a catalyst is not necessary, however, the use of a compound R—O—A which may be not soluble in the solvent will appreciably slow the reaction rate, and in such a case the use of a phase-transfer catalyst, e.g., tetrabutylphosphonium chloride, will improve the reaction rate significantly. The reaction temperature is in general selected within the interval from room temperature to 200 degrees Centigrade and preferably from 50 to 150 degrees Centigrade. The reaction time, which depends on the reaction temperature, will range from 1 to 100 hours. When A in the R—O—A compound is hydrogen, it is preferred that base be added, in a quantity at least equimolar with the compound R—O—A, in order to tr ⇌ the hydrochloric acid generated in the reaction.

Said bases are exemplified by hydroxides such as sodium hydroxide, potassium hydroxide, and magnesium hydroxide; by hydrides such as sodium hydride and potassium hydride; and by amines such as triethylamine and pyridine.

EXAMPLES

The invention will be explained below with reference to illustrative examples. In the examples, parts are parts by weight, %=weight %, and the viscosity was measured at 25 degrees Centigrade. The liquid crystallinity was evaluated by placing a sample between two crossed polarizing sheets and observing light transmission microscopically as the temperature was varied. The liquid-crystalline range given in the examples is based on the following two points: the boundary temperature between the solid and a fluid liquid-crystalline state, and the boundary temperature between the liquid-crystalline state and the isotropic liquid.

EXAMPLE 1

Fifteen parts of trimethylsiloxy-terminated methylhydrogenpolysiloxane having a viscosity of 30 centistokes, 100 parts of toluene, and 0.3 parts 2% of an isopropanol solution of chloroplatinic acid were placed in a four-necked flask, and 36 parts vinylbenzyl chloride was dripped in while heating to 70 degrees Centigrade. After addition and heating under reflux for 6 hours, the disappearance of the SiH peak was confirmed by infrared analysis (IR) and nuclear magnetic resonance analysis (NMR). After filtration, the toluene and unreacted material were removed by distillation in vacuo. The resulting organopolysiloxane (CP-1) was identified by NMR as a trimethylsiloxy-terminated methyl(-chloromethylphenylethyl)polysiloxane.

Twenty-five parts p-phenylphenol, 100 parts ethanol, and 4.9 parts finely divided sodium hydroxide were placed in a four-necked flask, and the mixture was stirred with heating until complete dissolution of the sodium hydroxide. 25 Parts CP-1 and 200 parts toluene were added to the mixture, which was then heated under reflux for 15 hours. Dilute hydrochloric acid was then added to the reaction mixture until the flask's contents were weakly acidic, and the solvent was removed by distillation in vacuo. The contents were dissolved in chloroform, this was washed with water, and the chloroform was evaporated to afford a white solid. This polymer exhibited liquid crystallinity in the interval from 90 to 120 degrees Centigrade. The same reaction result was obtained when the CP-1 and p-phenylphenol were reacted in the presence of 0.5% ethylenediamine.

For comparison, a hydrosilylation reaction was conducted as known from the prior art. Thus, 16 parts trimethylsiloxy-terminated methylhydrogenpolysiloxane with a viscosity of 30 centistokes, 100 parts toluene, and 0.3 parts of a 2% isopropanol solution of chloroplatinic acid were placed in a four-necked flask. 60 parts p-(p'-cyanophenyl)allyloxybenzene was then added while heating at 70 degrees Centigrade. Synthesis of liquid-crystalline organopolysiloxane by heating under reflux was not possible when 0.3% ethylenediamine was present in the system.

EXAMPLE 2

One hundred sixty-seven parts of a 10% solution in ethanol of the sodium salt of p-(p'-cyanophenyl)phenol, 200 parts toluene, and 15.8 parts CP-1 as described in Example 1 were placed in a four-necked flask, and the mixture was heated under reflux for 20 hours. After the addition of dilute hydrochloric acid until the flask's contents were weakly acidic, the solvent was removed by distillation in vacuo, and the contents were dissolved in chloroform. After washing with water, the chloroform was removed by evaporation to afford a light brown solid. This polymer exhibited liquid crystallinity in the temperature interval from 40 to 140 degrees Centigrade.

EXAMPLE 3

Twenty parts tetrakis(dimethylhydrogensiloxy)silane, 80 parts toluene, and 0.2 parts of a 2% isopropanol solution of chloroplatinic acid were placed in a four-necked flask and heated to 70 degrees Centigrade. 74 Parts of a 50% toluene solution of vinylbenzyl chloride was then added dropwise from an addition funnel. After the completion of addition followed by heating under reflux for 6 hours, NMR analysis confirmed the disappearance of the SiH peak. Filtration and removal of the solvent and unreacted material by distillation in vacuo afforded a product designated as CP-2.

Fifteen parts p-(p'-cyanophenyl)phenol, 100 parts ethanol, and 3.1 parts finely divided sodium hydroxide were placed in a four-necked flask. After heating with stirring until the sodium hydroxide had completely dissolved, 17.1 parts CP-2 and 200 parts toluene were added, followed by heating under reflux for 18 hours. Dilute hydrochloric acid was added until the flask's contents became weakly acidic, and the solvent was then removed by distillation in vacuo. The contents were dissolved in chloroform, and, after washing with water, the chloroform was removed by evaporation to afford a white syrupy material. This polymer exhibited liquid crystallinity in the temperature interval from 25 to 136 degrees Centigrade.

In the instant invention, the method for the production of liquid-crystalline organopolysiloxanes, the mesogenic group is introduced by means of a condensation reaction between a particular type of mesogenic compound and organopolysiloxanes containing the halomethylphenyl group. Because the hydrosilylation reaction of prior methods is not employed in the present case, the reaction can be run without requiring an operation for the removal of substances which are catalyst poisons. The present invention, by providing a synthesis of liquid-crystalline organopolysiloxane using starting materials which are more easily acquired and less expensive than in the prior art, is very useful to the industry.

Liquid-crystalline organopolysiloxanes obtained by means of the present invention are useful, for example, for the display and recording of optical information, by exploiting the optical properties of these compounds.

What is claimed is:

1. A method for the production of liquid-crystalline organopolysiloxanes which comprises
   (I) contacting a compound having the general formula ROA with an organopolysiloxane containing in each molecule, at least one group of the unit formula

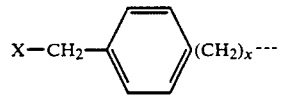

wherein
   R is a monovalent organic group which contains at least one group selected from the groups consisting of
   (i) substituted monocyclic aromatic hydrogen-carbon groups,
   (ii) substituted polycyclic aromatic hydrocarbon groups,
   (iii) unsubstituted monocyclic aromatic hydrocarbon groups,
   (iv) unsubstituted polycyclic aromatic hydrocarbon groups;
   A is a hydrogen atom or an alkali metal; X is a halogen;
   x has a value of 0 to 10 and,
   (II) recovering the liquid-crystalline organopolysiloxane.

2. A method as claimed in claim 1, wherein X is chlorine.

3. A method as claimed in claim 1, wherein R is a substituted biphenyl group.

4. A method as claimed in claim 1, wherein R is an unsubstituted biphenyl group.

5. A method as claimed in claim 1, wherein the methyl group constitutes at least 50 mol % of the silicon-bonded organic group in the liquid-crystalline organopolysiloxane.

* * * * *